(12) United States Patent
Sakamoto et al.

(10) Patent No.: US 11,740,405 B2
(45) Date of Patent: Aug. 29, 2023

(54) OPTICAL MULTIPLEXING CIRCUIT AND LIGHT SOURCE

(71) Applicant: Nippon Telegraph and Telephone Corporation, Tokyo (JP)

(72) Inventors: Junji Sakamoto, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/614,687

(22) PCT Filed: May 30, 2019

(86) PCT No.: PCT/JP2019/021630
§ 371 (c)(1),
(2) Date: Nov. 29, 2021

(87) PCT Pub. No.: WO2020/240798
PCT Pub. Date: Dec. 3, 2020

(65) Prior Publication Data
US 2022/0229235 A1 Jul. 21, 2022

(51) Int. Cl.
*G02B 6/12* (2006.01)
*G02B 6/125* (2006.01)
*G02B 6/42* (2006.01)
(52) U.S. Cl.
CPC ......... *G02B 6/12016* (2013.01); *G02B 6/125* (2013.01); *G02B 6/12019* (2013.01);
(Continued)

(58) Field of Classification Search
CPC ............ G02B 6/12016; G02B 6/12019; G02B 6/125; G02B 6/4204; G02B 2006/12097;
(Continued)

(56) References Cited

U.S. PATENT DOCUMENTS

2002/0031304 A1* 3/2002 Roberts ................ G02B 6/1228
385/28
2018/0128979 A1* 5/2018 Heanue .............. G02B 6/12026

OTHER PUBLICATIONS

Akira Nakao et al., *Integrated Waveguide-Type Red-Green-Blue Beam Combiners for Compact Projection-Type Displays*, Optics Communications, vol. 330, 2014, pp. 45-48.
(Continued)

*Primary Examiner* — John Bedtelyon
(74) *Attorney, Agent, or Firm* — Workman Nydegger

(57) ABSTRACT

To reduce the size while being able to accurately monitor light of a plurality of wavelengths. An optical multiplexing circuit includes: a plurality of branching units each configured to divide light output from a corresponding one of a plurality of input waveguides; a multiplexing unit configured to multiplex beams each being one beam of the light divided by each of the plurality of branching units; an output waveguide configured to output the light multiplexed by the multiplexing unit; and a plurality of monitoring waveguides each configured to output another beam of the light divided by each of the plurality of branching units, wherein at least one monitoring waveguide of the plurality of monitoring waveguides includes a bent waveguide constituted by a rib-shaped waveguide.

8 Claims, 8 Drawing Sheets

(52) U.S. Cl.
CPC .. *G02B 6/4204* (2013.01); *G02B 2006/12097* (2013.01); *G02B 2006/12119* (2013.01)

(58) Field of Classification Search
CPC ........ G02B 2006/12119; G02B 6/4291; G02B 6/1228; G02B 6/4215; G02B 2006/12147
See application file for complete search history.

(56) References Cited

OTHER PUBLICATIONS

Yoshinori Hibino, *An Array of Photonic Filtering Advantages: Arrayed-Waveguide-Grating Multi / Demultiplexers for Photonic Networks*, IEEE Circuits and Devices, Nov. 2000, pp. 21-27.
Akira Himeno et al., *Silica-Based Planar Lightwave Circuits*, IEEE Journal of Selected Topics in Quantum Electronics, vol. 4, No. 6, 1998, pp. 913-924.
J. Sakamoto et al., *High-Efficiency Multiple-Light-Source Red-Green-Blue Power Combiner with Optical Waveguide Mode Coupling Technique*, SPIE OPTO, 2017, vol. 10126, 2017, pp. 1-8.

* cited by examiner

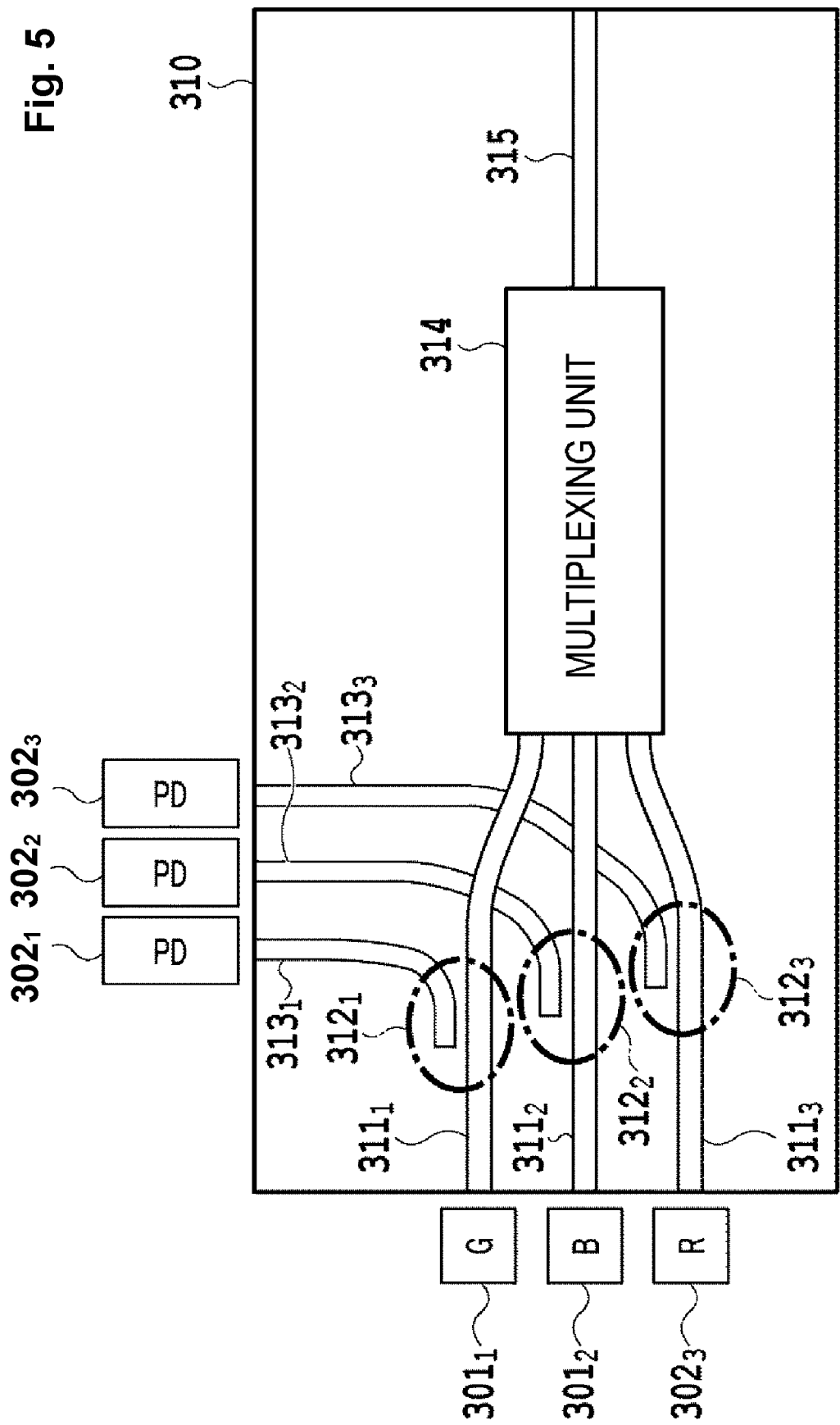

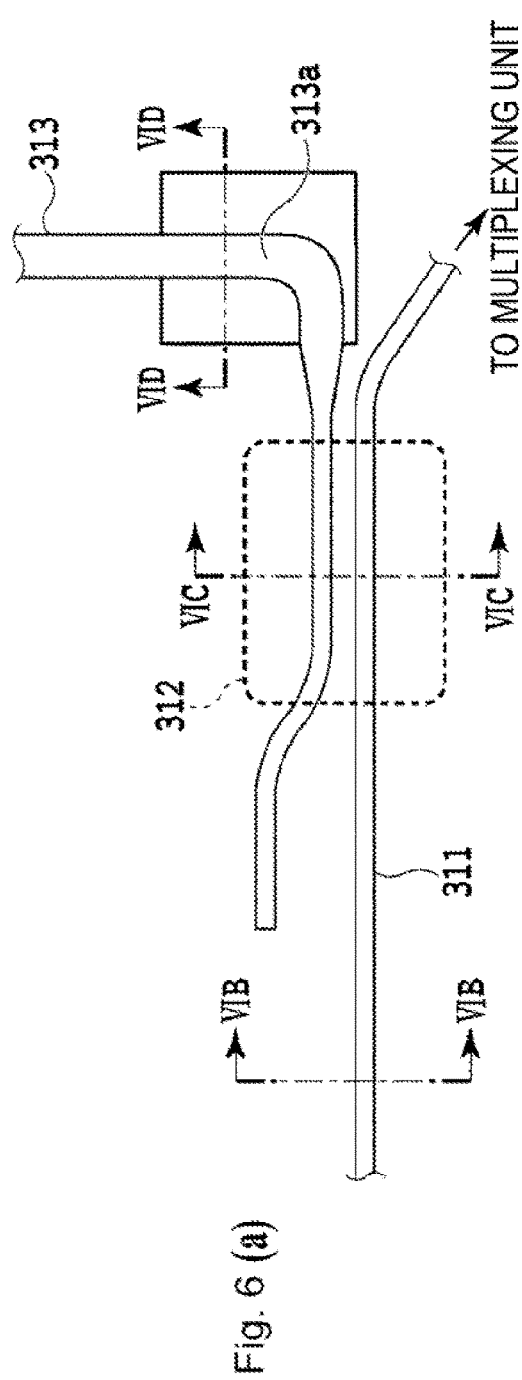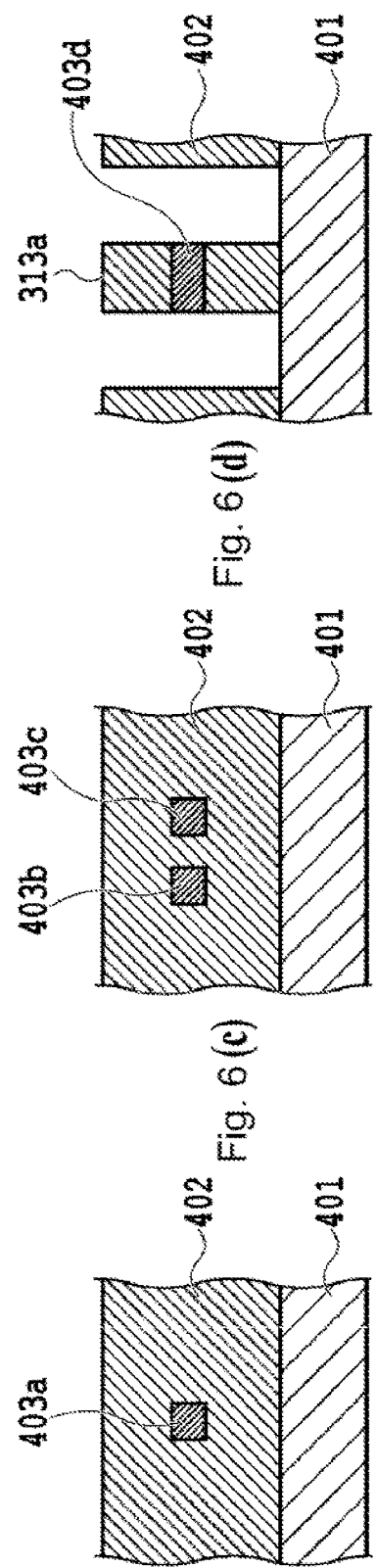

Fig. 7(a) 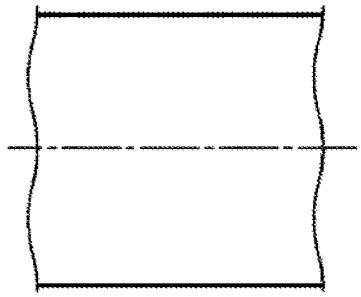 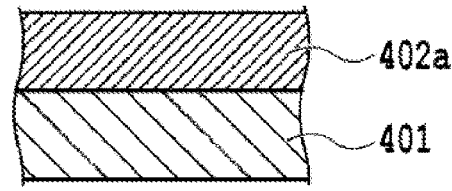
Fig. 7(b) 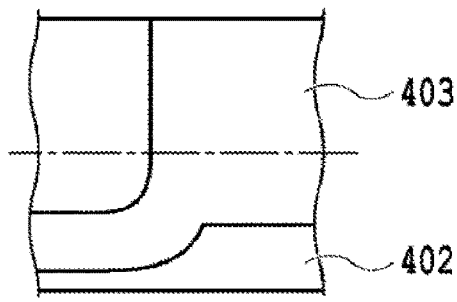 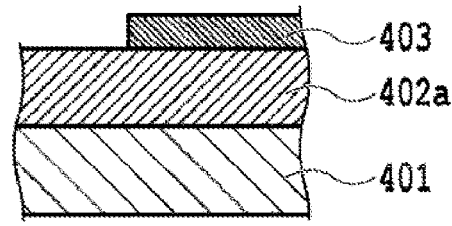
Fig. 7(c) 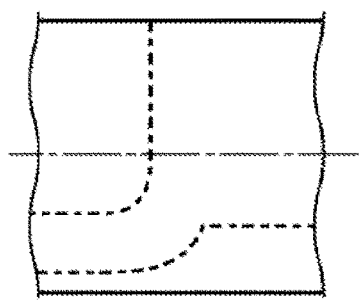 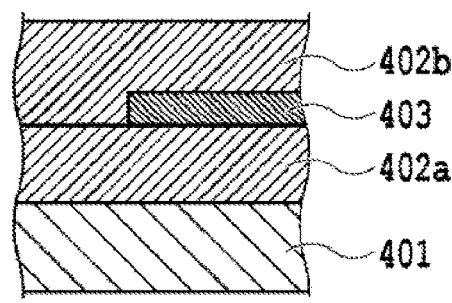
Fig. 7(d) 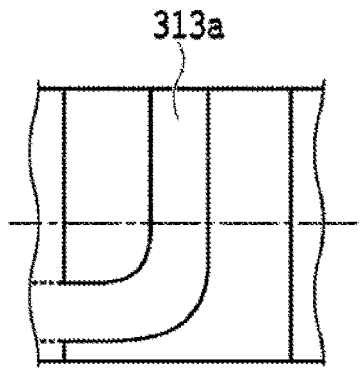 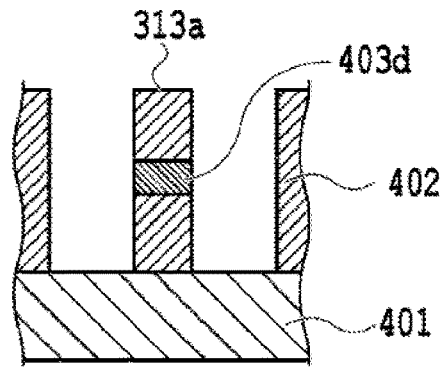

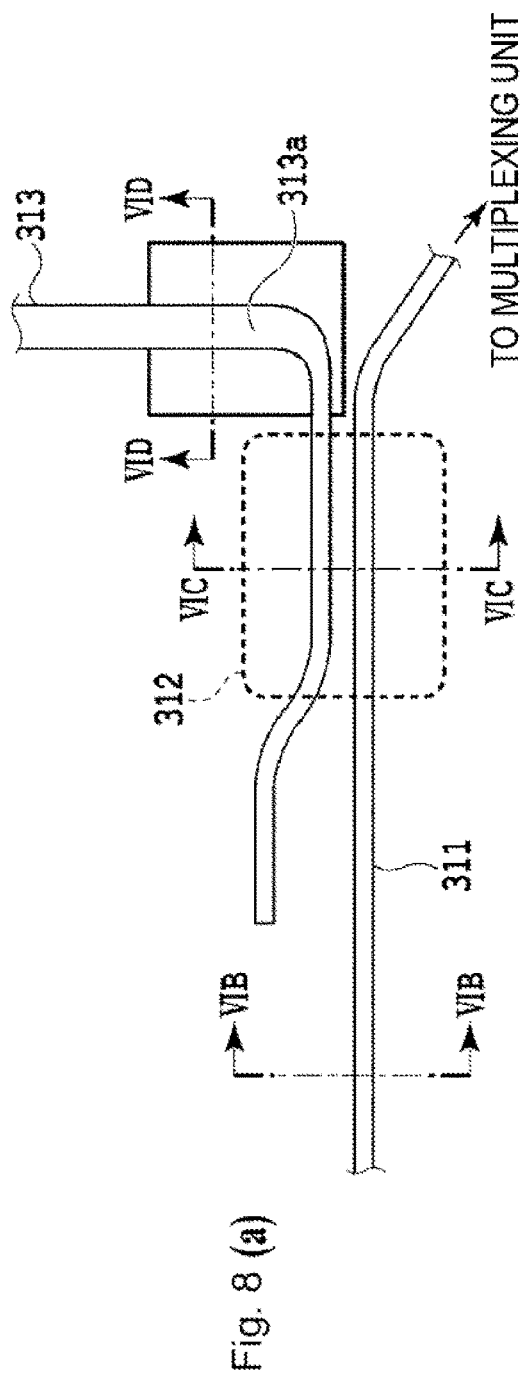
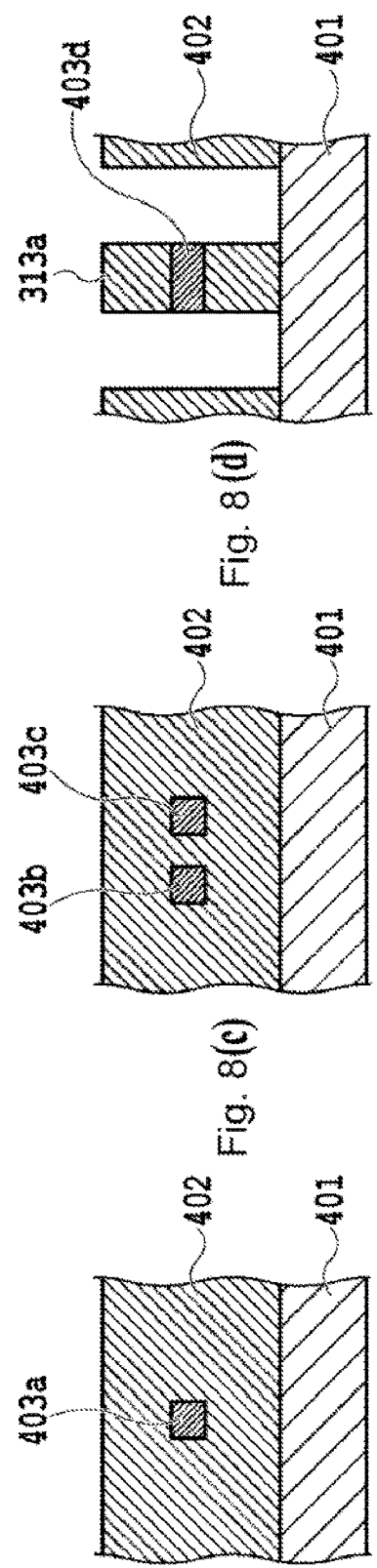
Fig. 8 (a)
Fig. 8(b)
Fig. 8(c)
Fig. 8(d)

OPTICAL MULTIPLEXING CIRCUIT AND LIGHT SOURCE

TECHNICAL FIELD

The present invention relates to an optical multiplexing circuit and a light source, and more particularly to an optical multiplexing circuit capable of multiplexing light of a plurality of wavelengths such as three primary colors of light and monitoring the intensity of light of each wavelength, and a light source including the optical multiplexing circuit.

BACKGROUND ART

In recent years, a small light source including laser diodes (LDs) that output light of three primary colors of red light (R), green light (G), and blue light (B) as a light source to be applied to a glasses-type terminal and a small pico projector has been developed. Since LDs have a higher directionality than LEDs, a focus-free projector can be realized. Further, since LDs have a high light emission efficiency and a low power consumption, and also a high color reproducibility, LDs have recently been attracting attention.

FIG. 1 illustrates a typical light source of a projector using LDs. The light source for the projector includes LDs 1 to 3 that output light of a single wavelength of respective colors of R, G, and B, lenses 4 to 6 that collimate the light output from the LDs 1 to 3, and dichroic mirrors 10 to 12 that multiplex the respective light and output the light to a MEMS mirror 16. RGB light combined into a single beam is swept by using the MEMS mirror 16 or the like and is synchronized with modulation of the LDs, and thus an image is projected onto a screen 17. Half mirrors 7 to 9 are respectively inserted between the lenses 4 to 6 and the dichroic mirrors 10 to 12, and white balance is adjusted by monitoring the divided light of each color by using photodiodes (PDs) 13 to 15.

In general, an LD emits light in a longitudinal direction of a resonator; however, because the accuracy when monitoring the rear side is poor, it is common to monitor the front side from which light is emitted (front monitoring). As illustrated in FIG. 1, for use as an RGB light source, bulk optical components such as the LDs 1 to 3, the lenses 4 to 6, the half mirrors 7 to 9, and the dichroic mirrors 10 to 12 need to be combined with a spatial optical system. Furthermore, for monitoring for an adjustment of white balance, since bulk components such as the half mirrors 7 to 9 and the PDs 13 to 15 are needed and the optical system increases in size, there is a problem in that a reduction in the size of the light source is hindered.

On the other hand, an RGB coupler using a planar lightwave circuit (PLC) instead of a spatial optical system with bulk components has been attracting attention (for example, see Non Patent Literature 1). In a PLC, an optical waveguide is produced on a planar substrate such as Si by patterning by photolithography or the like, and reactive ion etching, and a plurality of basic optical circuits (for example, a directional coupler, a Mach-Zehnder interferometer, and the like) are combined, and thus various functions can be realized (for example, see Non Patent Literatures 2 and 3).

FIG. 2 illustrates a basic structure of an RGB coupler using a PLC. An RGB coupler module including LDs 21 to 23 of respective colors of G, B, and R and a PLC-type RGB coupler 20 is illustrated. The RGB coupler 20 includes first to third waveguides 31 to 33 and first and second multiplexers 34 and 35 that multiplex light from two waveguides into a single waveguide. As methods using a multiplexer in an RGB coupler module, there are a method of using symmetrical directional couplers having the same waveguide width, a method of using a Mach-Zehnder interferometer (for example, see Non Patent Literature 1), and a method of using a mode coupler (for example, see Non Patent Literature 4), and the like.

By using a PLC, a spatial optical system using a lens, a dichroic mirror, or the like can be integrated on one chip. Further, since the LD of R and the LD of G have a weaker output than that of the LD of B, an RRGGB light source in which two LDs of R and two LDs of G are prepared is used. As described in Non Patent Literature 2, by using mode multiplexing, light of the same wavelength can be multiplexed in different modes, and an RRGGB coupler can also be easily realized by using a PLC.

CITATION LIST

Non Patent Literature

[Non Patent Literature 1] A. Nakao, R. Morimoto, Y. Kato, Y. Kakinoki, K. Ogawa and T. Katsuyama, "Integrated Waveguide-type Red-green-blue Beam Combiners for Compact Projection-type Displays", Optics Communications 320 (2014) 45-48

[Non Patent Literature 2] Y. Hibino, "Arrayed-Waveguide-Grating Multi/Demultiplexers for Photonic Networks," IEEE CIRCUITS & DEVICES, November, 2000, pp. 21-27

[Non Patent Literature 3] A. Himeno, et al., "Silica-based Planar Lightwave Circuits," J. Sel. Top. Q. E., vol. 4, 1998, pp. 913-924

[Non Patent Literature 4] J. Sakamoto et al. "High-efficiency Multiple-light-source Red-green-blue Power Combiner with Optical Waveguide Mode Coupling Technique," Proc. of SPIE Vol. 10126 101260 M-2

SUMMARY OF THE INVENTION

Technical Problem

FIG. 3 illustrates a configuration of an RGB coupler using two directional couplers. An RGB coupler 100 using the PLC includes first to third input waveguides 101 to 103, first and second directional couplers 104 and 105, and an output waveguide 106 connected to the second input waveguide 102.

A waveguide length, a waveguide width, and a gap between the waveguides are designed such that the first directional coupler 104 couples light of $\lambda 2$ incident from the first input waveguide 101 to the second input waveguide 102, and couples light of $\lambda 1$ incident from the second input waveguide 102 to the first input waveguide 101 and back to the second input waveguide 102. A waveguide length, a waveguide width, and a gap between the waveguides are designed such that the second directional coupler 105 couples light of $\lambda 3$ incident from the third input waveguide 103 to the second input waveguide 102, and passes light of $\lambda 1$ and $\lambda 2$ coupled to the second input waveguide 102 in the first directional coupler 104.

For example, green light G (wavelength $\lambda 2$) is incident on the first input waveguide 101, blue light B (wavelength $\lambda 1$) is incident on the second input waveguide 102, red light R (wavelength $\lambda 3$) is incident on the third input waveguide 103, and the three colors of light R, G, and B are multiplexed by the first and second directional couplers 104 and 105 and output from the output waveguide 106. Light of 450 nm, light of 520 nm, and light of 638 nm are used as the wavelengths of λ1, λ2, and λ3, respectively.

Thus, the application of such an RGB coupler to configure a light source including a monitoring function for an adjustment of white balance is demanded. Meanwhile, an optical circuit using a PLC is an embedded waveguide, which has weak confinement of light, and the minimum bend radius of the waveguide is limited. Accordingly, when a monitoring function is added to the RGB coupler 100, there has been a problem in that the accuracy of monitoring is limited due to design constraints of the optical circuit.

Means for Solving the Problem

An object of the present invention is to provide an optical multiplexing circuit including a multiplexing unit constituted by a PLC, which can accurately monitor light of a plurality of wavelengths with the size being reduced, and a light source including the optical multiplexing circuit.

According to the present invention, in order to achieve such an object, an embodiment of an optical multiplexing circuit includes: a plurality of branching units each configured to divide light output from a corresponding one of a plurality of input waveguides; a multiplexing unit configured to multiplex beams each being one beam of the light divided by each of the plurality of branching units; an output waveguide configured to output the light multiplexed by the multiplexing unit; and a plurality of monitoring waveguides each configured to output another beam of the light divided by each of the plurality of branching units, wherein at least one monitoring waveguide of the plurality of monitoring waveguides includes a bent waveguide constituted by a rib-shaped waveguide.

Effects of the Invention

According to the present invention, the monitoring waveguide includes a bent waveguide constituted by a rib-shaped waveguide, so that the accuracy of the monitoring can be maintained while the size of the optical wave circuit can be reduced without limiting the minimum bend radius of the waveguide.

BRIEF DESCRIPTION OF DRAWINGS

FIG. 5 is a diagram illustrating a light source with a monitoring function according to a second embodiment of the present invention.

FIGS. 6(a)-6(d) diagrams illustrating a monitoring waveguide according to a third embodiment of the present invention.

FIGS. 7(a)-7(d) are diagrams illustrating a method of preparing the monitoring waveguide according to the third embodiment of the present invention.

FIGS. 8(a)-8(d) are diagrams illustrating a modified example of the monitoring waveguide according to the third embodiment.

DESCRIPTION OF EMBODIMENTS

Hereinafter, embodiments of the present disclosure will be described in detail with reference to the drawings. In the present embodiment, description is given for the case of a method using a directional coupler as a multiplexer, but the present invention is not limited to a multiplexing method. An RGB coupler that multiplexes wavelengths of three primary colors of light is described as an example, but it goes without saying that the present invention can be applied to optical multiplexing circuits that multiplex a plurality of other wavelengths.

First Embodiment

Figure 4:
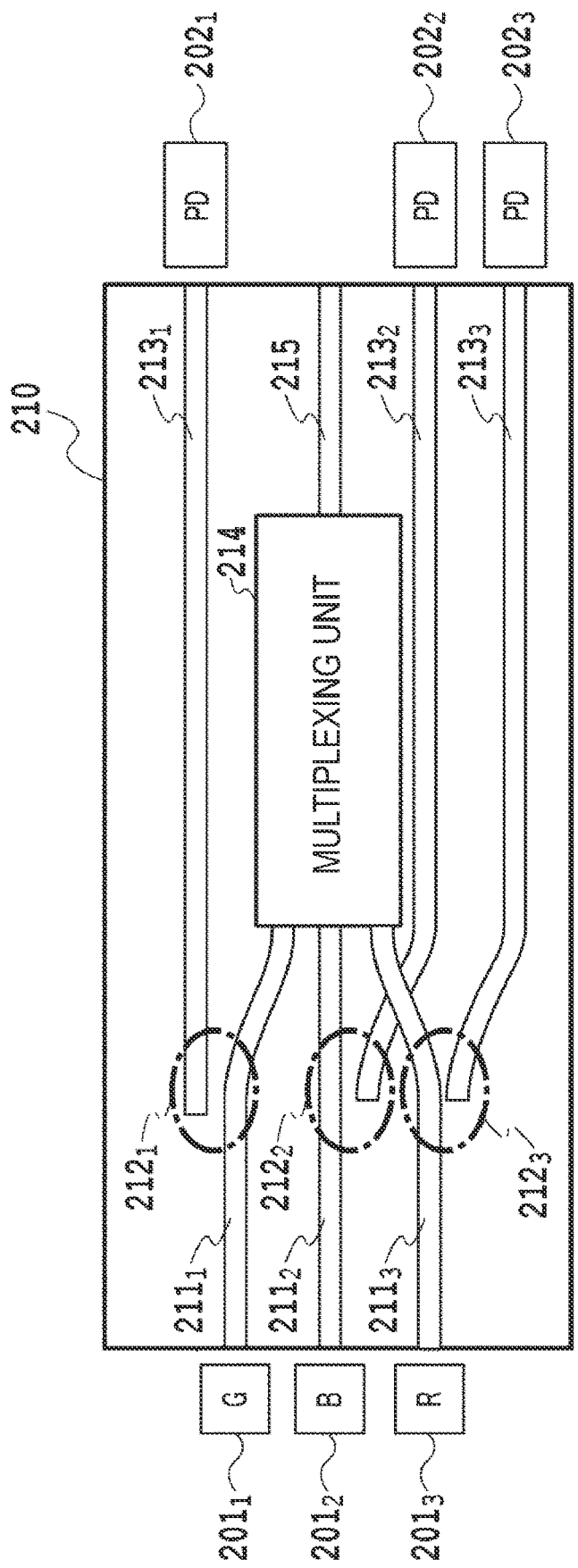
FIG. 4 is a diagram illustrating a light source with a monitoring function according to a first embodiment of the present invention.

FIG. 4 is a diagram illustrating a light source with a monitoring function according to a first example of a first embodiment of the present invention. A light source with a monitoring function includes first to third LDs $201_1$ to $201_3$ that respectively output light of respective colors of R, G, and B, a PLC-type RGB coupler 210, and first to third PDs $202_1$ to $202_3$ optically connected to the RGB coupler 210.

The PLC-type RGB coupler 210 includes first to third input waveguides $211_1$ to $211_3$ optically connected to the first to third LDs $201_1$ to $201_3$, first to third branching units $212_1$ to $212_3$ that divide light propagating through the waveguide into two, a multiplexing unit 214 that multiplexes one beam of the light divided by each of the first to third branching units $212_1$ to $212_3$, first to third monitoring waveguides $213_1$ to $213_3$ that output the other beam of the light divided by each of the first to third branching units $212_1$ to $212_3$ to the first to third PDs $202_1$ to $202_3$, and an output waveguide 215 that outputs the light multiplexed by the multiplexing unit 214.

In the PLC-type RGB coupler 210, light incident on each of the first to third input waveguides $211_1$ to $211_3$ is divided into two by each of the first to third branching units $212_1$ to $212_3$. One beam of the divided light is output to the first to third PDs $202_1$ to $202_3$ via the first to third monitoring waveguides $213_1$ to $213_3$, and the other beam of the divided light is multiplexed by the multiplexing unit 214 and output to the output waveguide 215.

Figure 1:
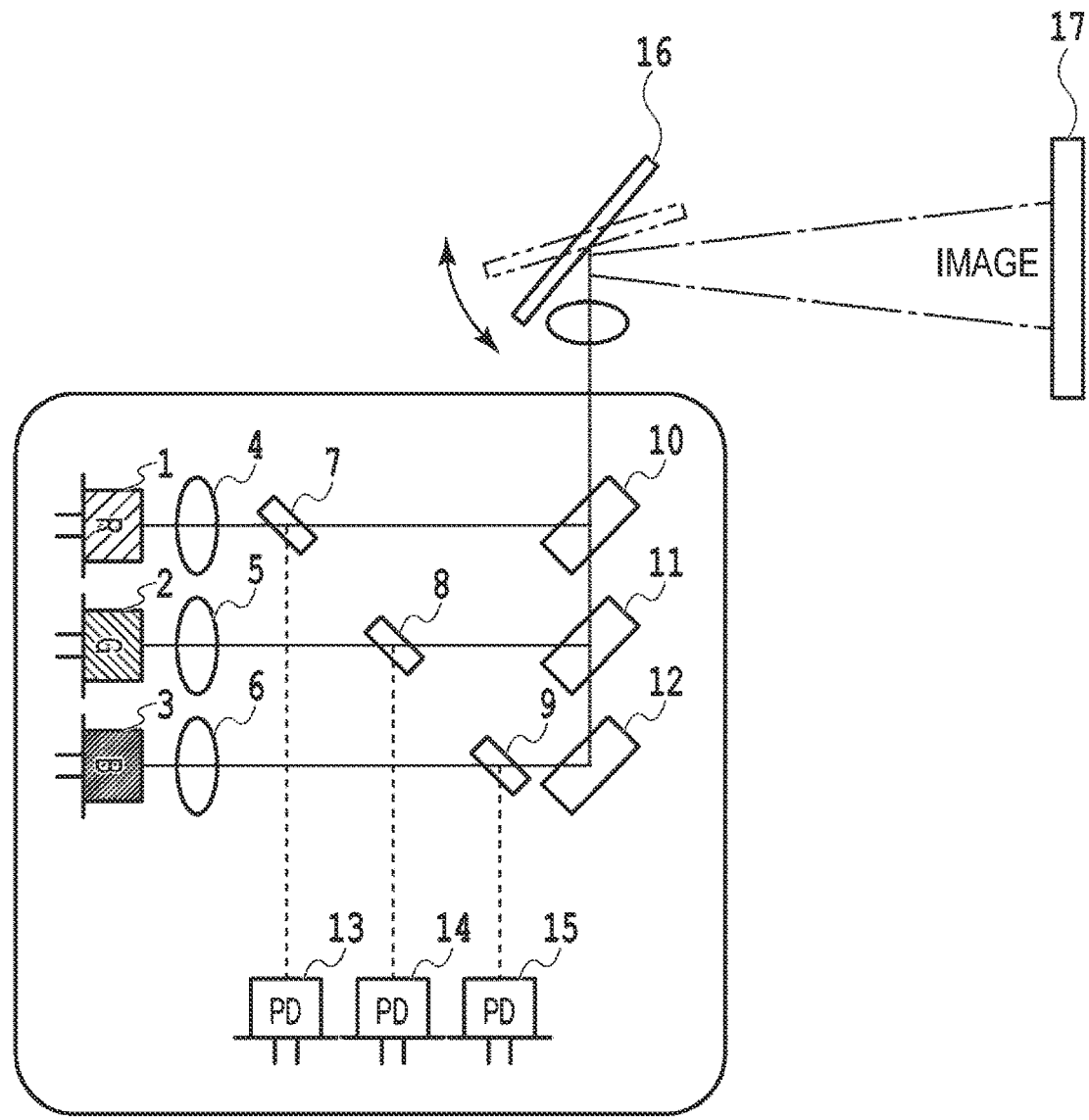
FIG. 1 is a diagram illustrating a typical light source of a projector using LDs.
Figure 2:
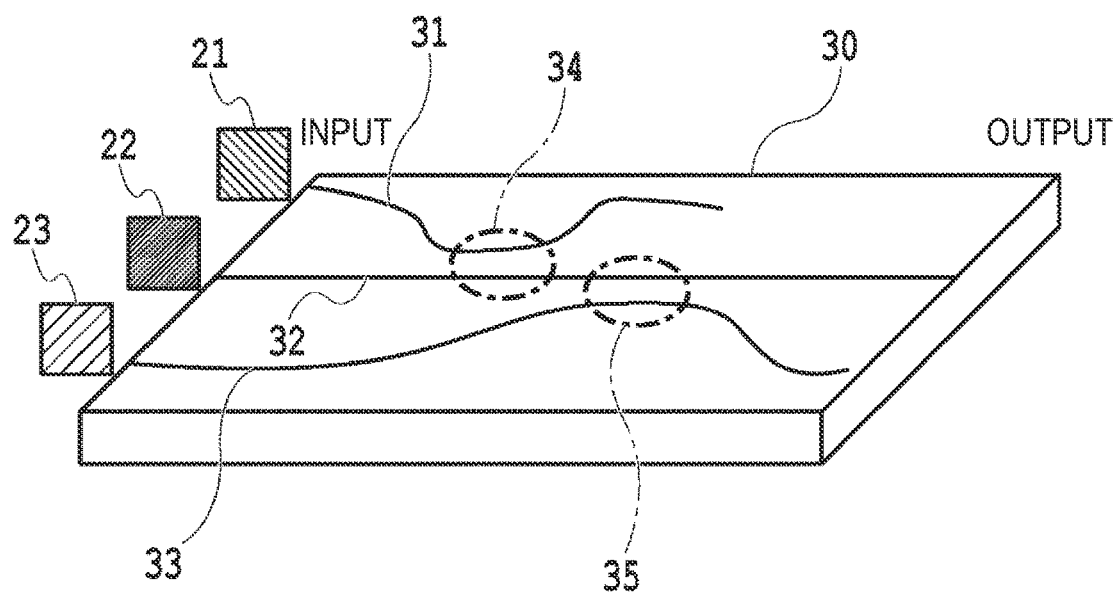
FIG. 2 is a diagram illustrating a basic structure of an RGB coupler using a PLC.
Figure 3:
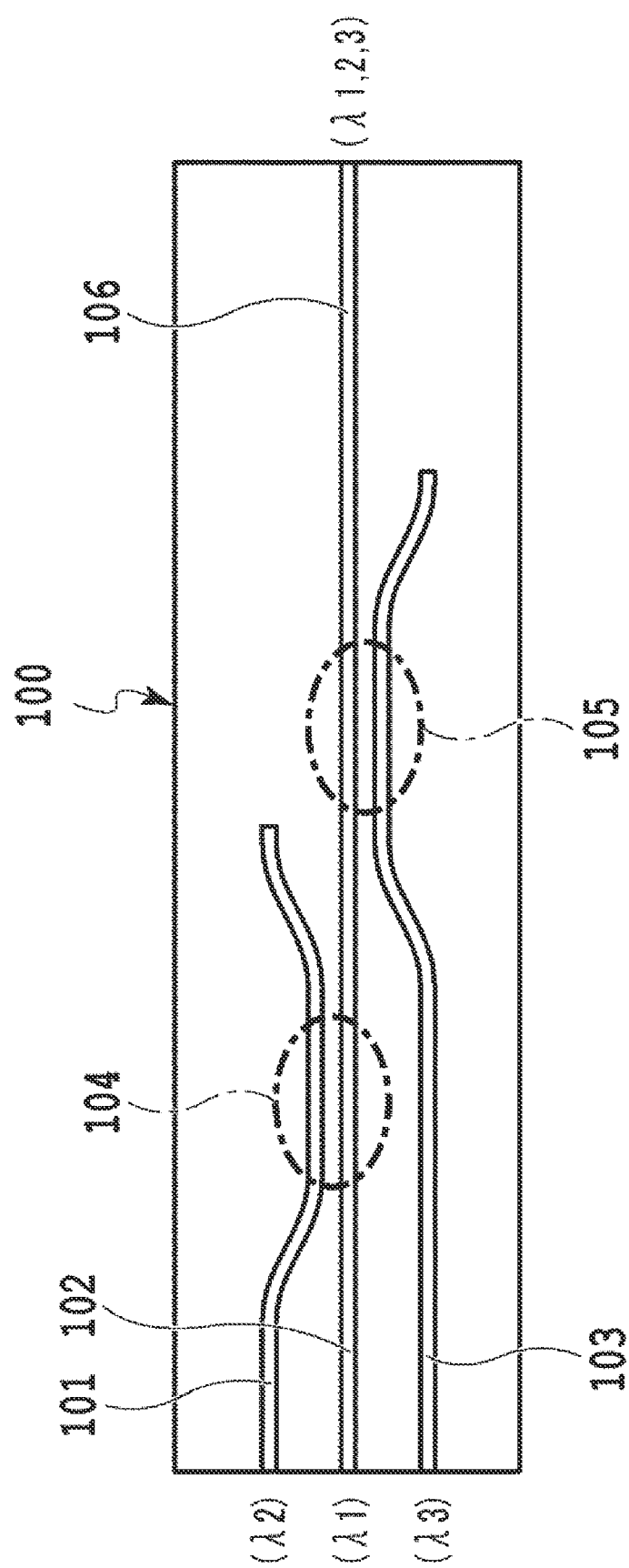
FIG. 3 is a diagram illustrating a configuration of an RGB coupler using two directional couplers.

An optical multiplexing circuit using the directional coupler illustrated in FIG. 3 can be used as the multiplexing unit 214. In this case, the first to third input waveguides $211_1$ to $211_3$ are coupled to the first to third input waveguides 101 to 103 illustrated in FIG. 3, respectively, and the output waveguide 215 is coupled to the output waveguide 106 illustrated in FIG. 3. However, the multiplexing unit 214 is not limited thereto, and another multiplexing unit of a waveguide type (for example, a Mach-Zehnder interferometer, a mode coupler, or the like) may be used.

As illustrated in FIG. 4, when light propagating through the first to third input waveguides $211_1$ to $211_3$ is divided by the first to third branching units $212_1$ to $212_3$, respectively, a coupling characteristic between the first to third LDs $201_1$ to $201_3$ and the first to third input waveguides $211_1$ to $211_3$ can be monitored. In addition, it is possible to adjust white balance as a light source by using a monitoring value of the first to third PDs $202_1$ to $202_3$ by recognizing a multiplexing characteristic of the multiplexing unit 214 in advance.

Second Embodiment

FIG. 5 illustrates a light source with a monitoring function according to a second embodiment of the present invention. According to the first embodiment, the first to third PDs $202_1$ to $202_3$ can respectively monitor light of the respective colors of R, G, and B. Thus, even if, for example, deviation from a design value of an RGB coupler is different between the short wavelength side (B) and the long wavelength side (R) due to an error in manufacturing, a white balance can be adjusted with high accuracy since feedback control can be performed individually. However, in a case where the PD 202 is disposed to face the emission surface of the LD 201, the PD 202 may be incident with stray light and accurate monitoring values may not be achieved. Stray light is light which has leaked out to the interior of the RGB coupler 210 without the output of the LD 201 coupling to the input waveguide 211, light that is not multiplexed by the multiplexing unit 214 or light that has leaked out therefrom, light that has leaked out to the interior of the RGB coupler 210 via a disposal port of the multiplexing unit 214, or the like.

Thus, in the second embodiment, the first to third monitoring waveguides $313_1$ to $313_3$ are bent waveguides for optical path conversion of 90 degrees so that the LD 301 and the PD 302 does not face each other. The emission direction of the light from the LD 301 and the emission direction of the light from the multiplexing unit 314 are configured to be generally perpendicular to the incident direction of the light at the PD 302, and thus it is possible to avoid stray light entering the PD 302.

The PLC-type RGB coupler 310 includes first to third input waveguides $311_1$ to $311_3$, first to third branching units $312_1$ to $312_3$, a multiplexing unit 314, first to third monitoring waveguides $313_1$ to $313_3$, and output waveguides 315. The first to third input waveguides $311_1$ to $311_3$ are optically connected to the first to third LDs $301_1$ to $301_3$. The first to third branching units $312_1$ to $312_3$ divide light propagating through the waveguides into two. The multiplexing unit 314 multiplexes one beam of the light divided by the first to third branching units $312_1$ to $312_3$. The other beam of the light divided by the first to third branching units $312_1$ to $312_3$ propagates through the first to third monitoring waveguides $313_1$ to $313_3$ and is output to the first to third PDs $302_1$ to $302_3$. The light multiplexed by the multiplexing unit 214 propagates through the output waveguide 315 to output.

Third Embodiment

As described above, an optical circuit using a PLC is an embedded waveguide, which has weak confinement of light, and the minimum bend radius of the waveguide is limited. In the second embodiment, the first to third monitoring waveguides $313_1$ to $313_3$ are bent waveguides for optical path conversion of 90 degrees. However, in a case of a small bend radius, the light divided by the first to third branching units $312_1$ to $312_3$ leak out and the accuracy of the monitoring falls. On the other hand, in a case of large bend radius, the chip size of the RGB coupler 310 is large.

Therefore, in a third embodiment, a rib-shaped waveguide is used as a bent waveguide for optical path conversion, and the lateral clad of the waveguide core is formed by air. Thus, a highly confined waveguide can be achieved. As a result, the minimum bend radius is reduced, and the expansion of the chip size of the RGB coupler 310 is suppressed.

FIG. 6 illustrates a monitoring waveguide according to the third embodiment of the present invention. FIG. 6 is an enlarged view of the vicinity of the connection between the branching unit 312 and the monitoring waveguide 313. As illustrated in FIG. 6(a), the branching unit 312 is a directional coupler having a single input and two outputs, which divides light propagating through the input waveguide 311 into two, and outputs the light to the monitoring waveguide 313 and the multiplexing unit 314.

As illustrated in FIG. 6(b), the input waveguide 311 is a single mode embedded waveguide in which a core 403a is embedded in a clad 402 on a substrate 401. As illustrated in FIG. 6(c), the branching unit 312, which is a directional coupler, is also constituted by an embedded waveguide in which the two cores 403b and 403c are disposed in close proximity.

The output of the branching unit 312 connected to the monitoring waveguide 313 is connected to a bent waveguide portion 313a with the waveguide width being widened in a tapered manner. A cross section of the bent waveguide portion 313a of the monitoring waveguide 313 is illustrated in FIG. 6(d). The bent waveguide portion 313a is a multi-mode rib-shaped waveguide in which the width of the core 403d is enlarged than the core 403a.

According to such a configuration, the light divided by the branching unit 312 is output to the PD 302 in a multi-mode via the monitoring waveguide 313 including the bent waveguide portion 313a. However, since the PD 302 directly receives the light emitted from the waveguide end surface of the RGB coupler 310, the measurement of optical power is not impaired. Therefore, by using a bent waveguide with a high confinement, it is possible to reduce the size of the RGB coupler 310 without reducing the accuracy of the monitoring.

FIG. 7 illustrates a method of preparing the monitoring waveguide according to the third embodiment of the present invention. A bottom clad layer 402a is deposited on the substrate 401 (FIG. 7(a)), and the core layer is further deposited and etched to form a core pattern 403 (FIG. 7(b)) so as to form a desired waveguide pattern (FIG. 7(b)). At this time, in the portion for creating the bent waveguide portion 313a, a large core layer is left in consideration of the accuracy of the subsequent photolithography. Here, the periphery of the bent waveguide portion 313a is left in a rectangular shape.

An upper clad layer 402b is deposited so as to cover the bottom clad layer 402a and the core pattern 403 to complete the embedded waveguide (FIG. 7(c)). Next, the clad and the core of the portion for creating the bent waveguide portion 313a is etched to form a rib-shaped waveguide (FIG. 7(d)).

In this way, only an etching step for the portion of the bent waveguide of the monitoring waveguide may be added in the PLC-type RGB coupler created by the conventional method, and in addition, a multi-mode waveguide with large allowable errors in manufacturing may be created, so it is possible to reduce the size of the RGB coupler 310 by the addition of a simple process.

FIG. 8 illustrates a modified example of the monitoring waveguide according to the third embodiment. The waveguide width is enlarged at the bent waveguide portion 313a without connecting a tapered waveguide to the output of the branching unit 312. The size of the RGB coupler 310 can be further reduced by removing the tapered waveguide.

Other Examples

For the monitoring waveguide 313, the bent waveguide portion 313a may be applied to all of the first to third monitoring waveguides $313_1$ to $313_3$ of the respective colors of R, G, and B in the RGB coupler 310 in FIG. 5. Meanwhile, the bent waveguide portion 313a may be applied to only the first monitoring waveguide $313_1$ for which a small bend radius is required or only the first and second monitoring waveguides $313_1$ and $313_2$.

REFERENCE SIGNS LIST 1 to 3, 21 to 23, 201, 301 LD
4 to 6 Lens
7 to 9 Half mirror
10 to 12 Dichroic mirror
13 to 15, 202, 302 Photodiode (PD)
16 MEMS
17 Screen
30, 100, 210, 310 RGB coupler
31 to 33 Waveguide
34, 35 Multiplexer
101 to 103, 211, 311 Input waveguide
104, 105 Directional coupler
106, 215, 315 Output waveguide
212, 312 Branching unit
213, 313 Monitoring waveguide
214, 314 Multiplexing unit
401 On substrate
402 Clad
403 Core

The invention claimed is:

1. An optical multiplexing circuit comprising:
a plurality of branching units each configured to divide light output from a corresponding one of a plurality of input waveguides;
a multiplexing unit configured to multiplex beams each being one beam of the light divided by each of the plurality of branching units;
an output waveguide configured to output the light multiplexed by the multiplexing unit; and
a plurality of monitoring waveguides each configured to output another beam of the light divided by each of the plurality of branching units,
wherein at least one monitoring waveguide of the plurality of monitoring waveguides includes a bent waveguide constituted by a rib-shaped waveguide,
wherein the plurality of input waveguides are single mode embedded waveguides in which a core is embedded in a clad on a substrate, and
wherein the plurality of branching units are embedded waveguides having two cores that are disposed in close proximity to each other while embedded in the clad on the substrate.

2. The optical multiplexing circuit according to claim 1, wherein the rib-shaped waveguide is a multi-mode waveguide.

3. The optical multiplexing circuit according to claim 2, wherein the at least one monitoring waveguide is configured such that an optical axis of the plurality of input waveguides and an emission direction of light from the multiplexing unit is generally perpendicular to an optical axis of the at least one monitoring waveguide.

4. A light source with a monitoring function, comprising:
the optical multiplexing circuit according to claim 2;
a plurality of laser diodes each optically coupled to a corresponding one of the plurality of input waveguides; and
a plurality of photodiodes each optically coupled to a corresponding one of the plurality of monitoring waveguides.

5. The optical multiplexing circuit according to claim 1, wherein the at least one monitoring waveguide is configured such that an optical axis of the plurality of input waveguides and an emission direction of light from the multiplexing unit is generally perpendicular to an optical axis of the at least one monitoring waveguide.

6. A light source with a monitoring function, comprising:
the optical multiplexing circuit according to claim 3;
a plurality of laser diodes each optically coupled to a corresponding one of the plurality of input waveguides; and
a plurality of photodiodes each optically coupled to a corresponding one of the plurality of monitoring waveguides.

7. A light source with a monitoring function, comprising:
the optical multiplexing circuit according to claim 1;
a plurality of laser diodes each optically coupled to a corresponding one of the plurality of input waveguides; and
a plurality of photodiodes each optically coupled to a corresponding one of the plurality of monitoring waveguides.

8. The light source with a monitoring function according to claim 7, wherein the plurality of laser diodes are three laser diodes that output light of three primary colors of red light (R), green light (G), and blue light (B).

* * * * *